United States Patent
Ikeyama

(10) Patent No.: US 7,792,803 B2
(45) Date of Patent: Sep. 7, 2010

(54) LOG RETRIEVING METHOD, LOG ADMINISTRATION APPARATUS, INFORMATION PROCESSING APPARATUS AND COMPUTER PRODUCT

(75) Inventor: Makoto Ikeyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 288 days.

(21) Appl. No.: 11/401,694

(22) Filed: Apr. 11, 2006

(65) Prior Publication Data

US 2007/0168317 A1    Jul. 19, 2007

(30) Foreign Application Priority Data

Jan. 17, 2006   (JP)   ............... 2006-008932

(51) Int. Cl.
*G06F 17/30* (2006.01)
(52) U.S. Cl. ............... 707/672; 707/648; 709/203; 709/219; 709/223; 709/224; 709/232
(58) Field of Classification Search ............... 701/1; 705/14; 709/203, 219, 223–224, 226, 232, 709/245
See application file for complete search history.

(56) References Cited

U.S. PATENT DOCUMENTS

| | | | | |
|---|---|---|---|---|
| 6,018,619 A | * | 1/2000 | Allard et al. ............... | 709/224 |
| 6,070,191 A | * | 5/2000 | Narendran et al. .......... | 709/226 |
| 6,134,588 A | * | 10/2000 | Guenthner et al. .......... | 709/226 |
| 6,314,465 B1 | * | 11/2001 | Paul et al. ............... | 709/226 |
| 6,377,975 B1 | * | 4/2002 | Florman ............... | 709/203 |
| 7,047,309 B2 | * | 5/2006 | Baumann et al. ............. | 709/232 |
| 7,111,061 B2 | * | 9/2006 | Leighton et al. ............. | 709/224 |
| 7,558,854 B2 | * | 7/2009 | Nakahara et al. ............. | 709/226 |
| 2002/0052942 A1 | * | 5/2002 | Swildens et al. ............. | 709/223 |
| 2002/0184096 A1 | * | 12/2002 | Kawahara et al. ............. | 705/14 |
| 2004/0111492 A1 | * | 6/2004 | Nakahara et al. ............. | 709/219 |
| 2005/0102427 A1 | * | 5/2005 | Yokota et al. ............... | 709/245 |
| 2008/0065617 A1 | * | 3/2008 | Burke et al. ............... | 707/5 |

FOREIGN PATENT DOCUMENTS

| | | |
|---|---|---|
| JP | 7-200365 | 8/1995 |
| JP | 11-327964 | 11/1999 |

* cited by examiner

*Primary Examiner*—Don Wong
*Assistant Examiner*—Sheree N Brown
(74) *Attorney, Agent, or Firm*—Greer, Burns & Crain, Ltd.

(57) ABSTRACT

A client communication controlling unit determines whether an input retrieval condition has been received. A retrieval condition judging unit judges whether the input retrieval condition is included in an internal retrieval condition that has been stored in a retrieval condition storing unit. A retrieval target determining unit determines a retrieval target from which logs are retrieved. A log retrieving unit retrieves logs based on the input retrieval condition. A recording unit updates the internal retrieval condition and a result of retrieval based on the input retrieval condition. A client communication controlling unit outputs the result of retrieval.

11 Claims, 7 Drawing Sheets

FIG.4

| SERIAL NUMBER | CONDITION |
|---|---|
| 1 | Node=sys1<br>Starttime=2005/09/30 00:00:00 |
| 2 | Node=sys1,sys2<br>Starttime= |
| ... | ... |

| CONDITION NUMBER | LOG MESSAGE |
|---|---|
| 2 | Message01 |
| 1 | Message02 |
| ... | ... |

500

LOG RETRIEVING METHOD, LOG ADMINISTRATION APPARATUS, INFORMATION PROCESSING APPARATUS AND COMPUTER PRODUCT

CROSS-REFERENCE TO RELATED APPLICATIONS

This application is based upon and claims the benefit of priority from the prior Japanese Patent Application No. 2006-008932, filed on Jan. 17, 2006, the entire contents of which are incorporated herein by reference.

BACKGROUND OF THE INVENTION

1. Field of the Invention

The present invention relates to a technology for administering a log in a distribution system.

2. Description of the Related Art

In a distribution system, investigation or retrieval is performed on logs collected for maintenance work for each system on the distribution system or for research on a cause of a fault. Conventionally, logs necessary for each system are collected in real-time by an administration system, and retrieval is performed with respect to the collected logs. When necessary logs are not collected in real-time, retrieval is performed for each system.

For example, log information that can be a determination material for predicting faults is extracted at a terminal connected to a host computer through a communication line. By centralized administration of the extracted log information by the host computer, abnormality can be grasped in advance and faults can be precluded (for example, Japanese Patent Application Laid-Open Publication No. H7-200365).

In recent years, a scale of systems is increasing. Accordingly, a scheme of collecting logs by an administration system in real-time can be a factor that increases a load on the network and the administration system. Therefore, a scheme of directly retrieving the logs present on the distribution system without collecting the logs in real-time is necessary.

In a scheme of directly retrieving the logs, transmission and reception of a result of retrieval between networks for each retrieval are necessary. In a shop monitoring system that monitors machines in shops, to facilitate reduction of the network load, log data are collected without transmitting or receiving predetermined application logs (for example, Japanese Patent Application Laid-Open Publication No. H11-327964).

However, in the conventional technique described above, logs are collected under predetermined conditions. Therefore, if conditions necessary for maintenance work or research on a cause of a fault are not set, logs present in each system must be directly retrieved. If many conditions are set to collect necessary logs, a large number of logs are collected and the network load increases. In other words, reduction of the network load can not be achieved, and therefore, retrieval response is degraded.

SUMMARY OF THE INVENTION

It is an object of the present invention to at least solve the above problems in the conventional technologies.

A log administration apparatus according to one aspect of the present invention administers an information processing apparatus. The log administration apparatus includes a receiving unit configured to receive a retrieval condition for a log of the information processing apparatus; a judging unit configured to judge whether input retrieval condition has relevance to a retrieval condition recorded in the log administration apparatus; a determining unit configured to determine a retrieval target from which the log is to be retrieved to at least one of the log administration apparatus and the information processing apparatus based on a result of judgment by the judging unit; a retrieving unit configured to retrieve a log satisfying the retrieval condition from among logs recorded in the retrieval target; and an output unit configured to output a result of retrieval by the retrieving unit.

An information processing apparatus according to another aspect of the present invention is connected to a log administration apparatus that administers logs of the information processing apparatus through a network. the information processing apparatus includes a retrieving unit configured to retrieve a log from logs recorded in the information processing apparatus based on a retrieval condition input to the log administration and a retrieval condition that has been recorded in the log administration apparatus, retrieved log being a log satisfying a condition that does not coincide with the recorded retrieval condition among the input retrieval condition; and a transmitting unit configured to transmit a result of retrieval by the retrieving unit to the log administration apparatus.

A method according to still another aspect of the present invention is of retrieving a log of an information processing apparatus connected, through a network, to a log administration apparatus that administers logs. The method includes receiving a retrieval condition for a log of the information processing apparatus; judging whether input retrieval condition has relevance to a retrieval condition recorded in the log administration apparatus; determining a retrieval target from which the log is to be retrieved to at least one of the log administration apparatus and the information processing apparatus based on a result of judgment at the judging; retrieving a log satisfying the retrieval condition from among logs recorded in the retrieval target; and outputting a result of retrieval at the retrieving.

A method according to still another aspect of the present invention is of retrieving a log of an information processing apparatus connected, through a network, to a log administration apparatus that administers logs. The method includes receiving a retrieval condition that is input to the log administration apparatus; comparing the input retrieval condition and a retrieval condition recorded in the log administration apparatus; retrieving, from logs recoded in the information processing apparatus, a log satisfying a condition that does not coincide with the recoded retrieval condition among the input retrieval condition; and transmitting a result of retrieval at he retrieving to the log administration apparatus.

A computer-readable recording medium according to still another aspect of the present invention stores therein a computer program for realizing methods according to the above aspects.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 4 is a schematic showing an example of internal retrieval conditions stored in a retrieval condition storing unit according to the embodiment;

FIG. 5 is a schematic showing an example of a retrieval result stored in a log cache according to the embodiment;

DETAILED DESCRIPTION OF THE PREFERRED EMBODIMENTS

Exemplary embodiments according to the present invention will be explained in detail below with reference to the accompanying drawings.

Figure 1:
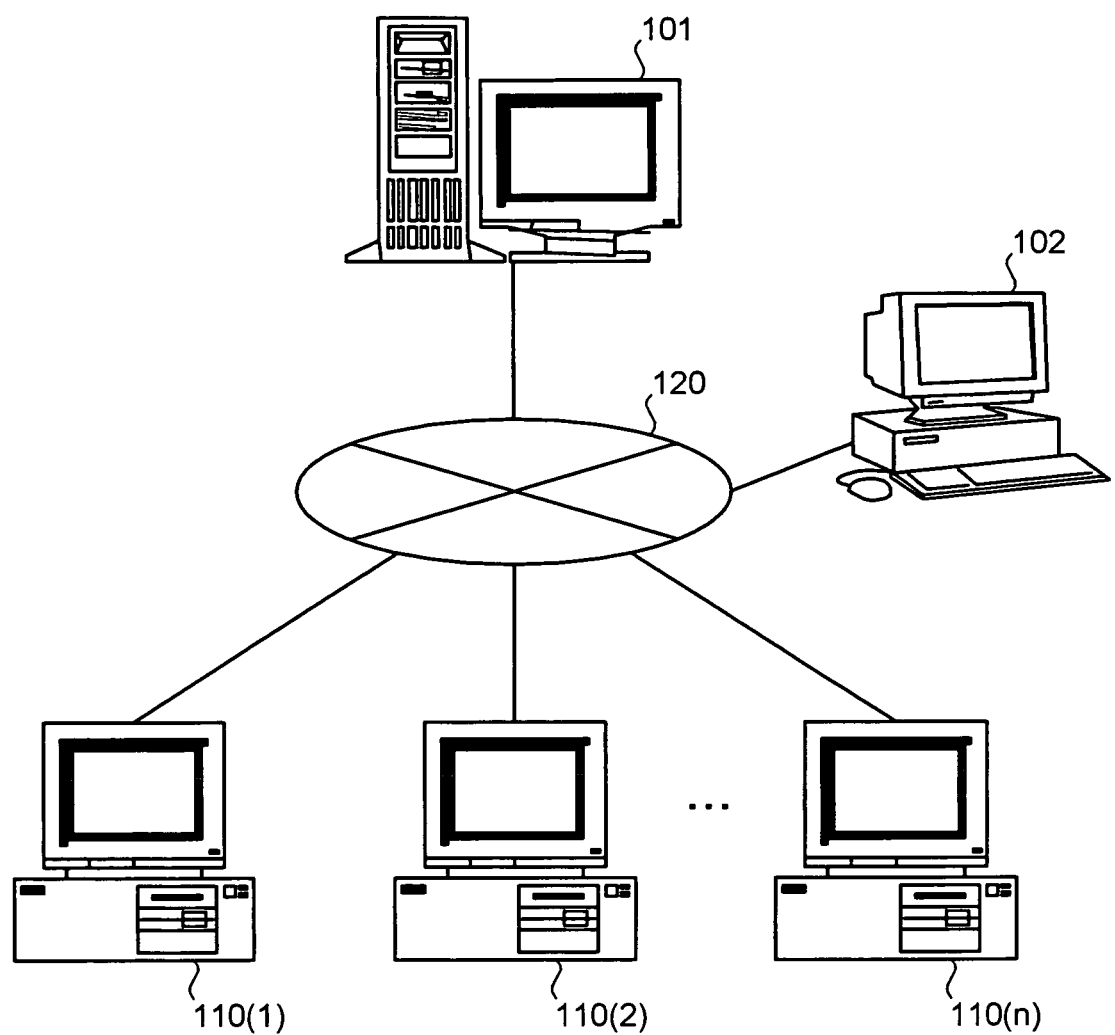
FIG. 1 is a schematic of a distribution system according to an embodiment of the present invention.

FIG. 1 is a schematic of a distribution system according to an embodiment of the present invention. As shown in FIG. 1, a log administration apparatus 101, an administering client 102, and a plurality of information processing apparatuses 110(1) to (n) are connected through a network such as the Internet, etc., in a distribution system according to an embodiment of the present invention.

The log administration apparatus 101 executes log administration of the information processing apparatuses 110(1) to (n). For example, the apparatus 101 retrieves logs that fall under retrieval conditions based on the retrieval conditions of logs input from the administering client 102 described later, where the logs that fall under the retrieval conditions are, for example, logs that satisfy the retrieval condition. The retrieval of the logs may be configured to request retrieval to the information processing apparatuses 110(1) to (n) through the network 120, or configured to retrieve from a log cache described later referring to FIG. 3.

The administering client 102 inputs the log administration apparatus 101 retrieval conditions relating to retrieval of logs of the information processing apparatuses 110(1) to (n). The retrieval conditions may be configured to, for example, accept an input from a user, and are conditions for retrieve the logs to be used for maintenance work and research on the cause of occurrence of a fault.

The information processing apparatuses 110(1) to (n) execute predetermined information processing, and record in log files as logs operations in predetermined information processing and records of input/output data. Logs in the information processing apparatuses 110(1) to (n) are administered by the log administration apparatus 101 and the information processing apparatuses 110(1) to (n) may be configured to retrieve logs based on a retrieval request input through the network 120 and transmit the retrieval result to the log administration apparatus 101.

The network 120 such as the Internet, etc., is connected with other apparatuses through a communication line. While in an example shown in FIG. 1, the network 120 is connected with the log administration apparatus 101, the administering client 102, and the information processing apparatuses 110(1) to (n), the system may be configured for each apparatus to be connected with each other through an interface (I/F) such as a modem and a local area network (LAN) adaptor.

In the description of FIG. 1, the log administration apparatus 101 and the administering client 102 are configured to be connected through the network 120. However, an apparatus that has the functions of the log administration apparatus 101 and the administering client 102 therein may be used.

Figure 2:
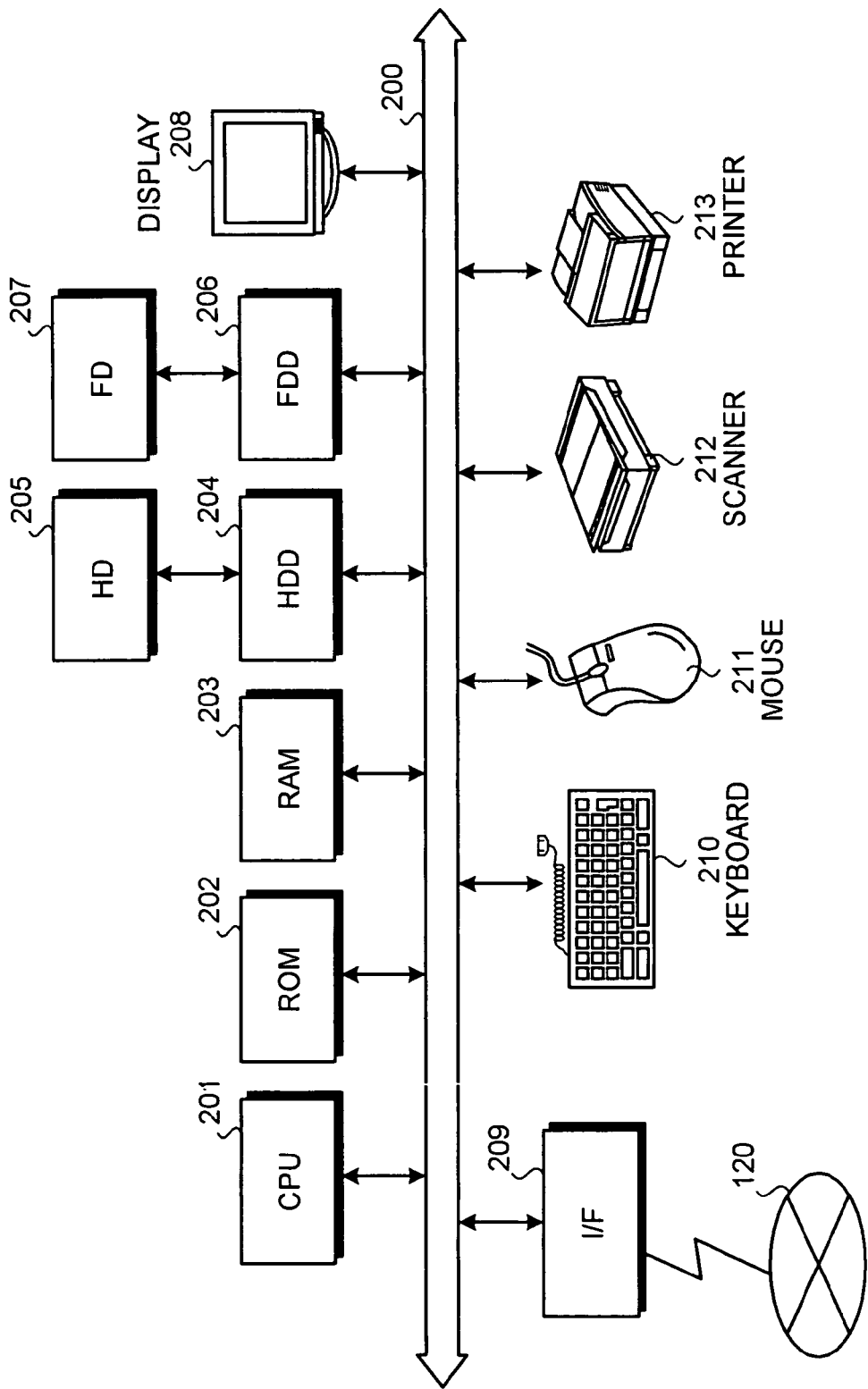
FIG. 2 is a schematic of a log administration apparatus according to the embodiment.

Referring to FIG. 2, the hardware configuration of the log administration apparatus 101, the administering client 102, and the information processing apparatuses 110(1) to (n) according to the embodiment will be described. Respective hardware configuration of the log administration apparatus 101, the administering client 102, and the information processing apparatuses 110(1) to (n) is almost same. Therefore, in FIG. 2, the log administration apparatus 101 will be described and descriptions will be omitted for the administering client 102, and the information processing apparatuses 110(1) to (n). FIG. 2 is a schematic of the log administration apparatus according.

As shown in FIG. 2, the log administration apparatus 101 includes a central processing unit (CPU) 201, a read-only memory (ROM) 202, a random-access memory (RAM) 203, a hard disk drive (HDD) 204, a hard disk (HD) 205, a flexible disk drive (FDD) 206, a flexible disk (FD) 207 as an example of a removable recording medium, a display 208, an I/F 209, a keyboard 210, a mouse 211, a scanner 212, and a printer 213. Each component is connected through a bus 200 with each other.

The CPU 201 controls the entire log administration apparatus 101. The ROM 202 stores programs such as a boot program, etc. The RAM 203 is used as a work area of the CPU 201. The HDD 204 controls reading/writing of data from/to the HD 205 according to a control of the CPU 201. The HD 205 stores data written according to a control of the HDD 204.

The FDD 206 controls reading/writing of data from/to the FD 207 according to a control of the CPU 201. The FD 207 stores the data written by the control of the FDD 206, causes the log administration apparatus 101 to read the data stored in the FD 207, etc.

As a removable recording medium, besides the FD 207, a compact-disc read-only memory (CD-ROM), a compact-disc recordable (CD-R), a compact-disk rewritable (CD-RW), a magneto optical (MO) disk, a digital versatile disk (DVD), and a memory card may be used. In addition to a cursor, and icons or tool boxes, the display 208 displays data such as texts, images, functional information, etc. This display 208 may employ, for example, a cathode ray tube (CRT), a thin film transistor (TFT) liquid crystal display (LCD), a plasma display, etc.

The I/F 209 is connected to the network 120, through a communication line and is connected to other apparatuses through this network 120. The I/F 209 administers an internal interface with the network 120 and controls input/output of data from external apparatuses. For example, a modem, a LAN adapter, etc., may be employed as the I/F 209.

The keyboard 210 includes keys for inputting letters, digits, various instructions, etc., and executes input of data. The keyboard 210 may be a touch-panel-type input pad or a numeric key pad, etc. The mouse 211 executes shift of the cursor, selection of an region, or shift and size change of windows. The mouse 211 may be a track ball or a joy stick that similarly includes the function as a pointing device.

The scanner 212 optically reads images and captures image data into an image analyzing apparatus. The scanner 212 may have an optical character reader (OCR) function. The printer 213 prints image data and text data. For example, a laser printer or an ink jet printer may be employed as the printer 213.

Figure 3:
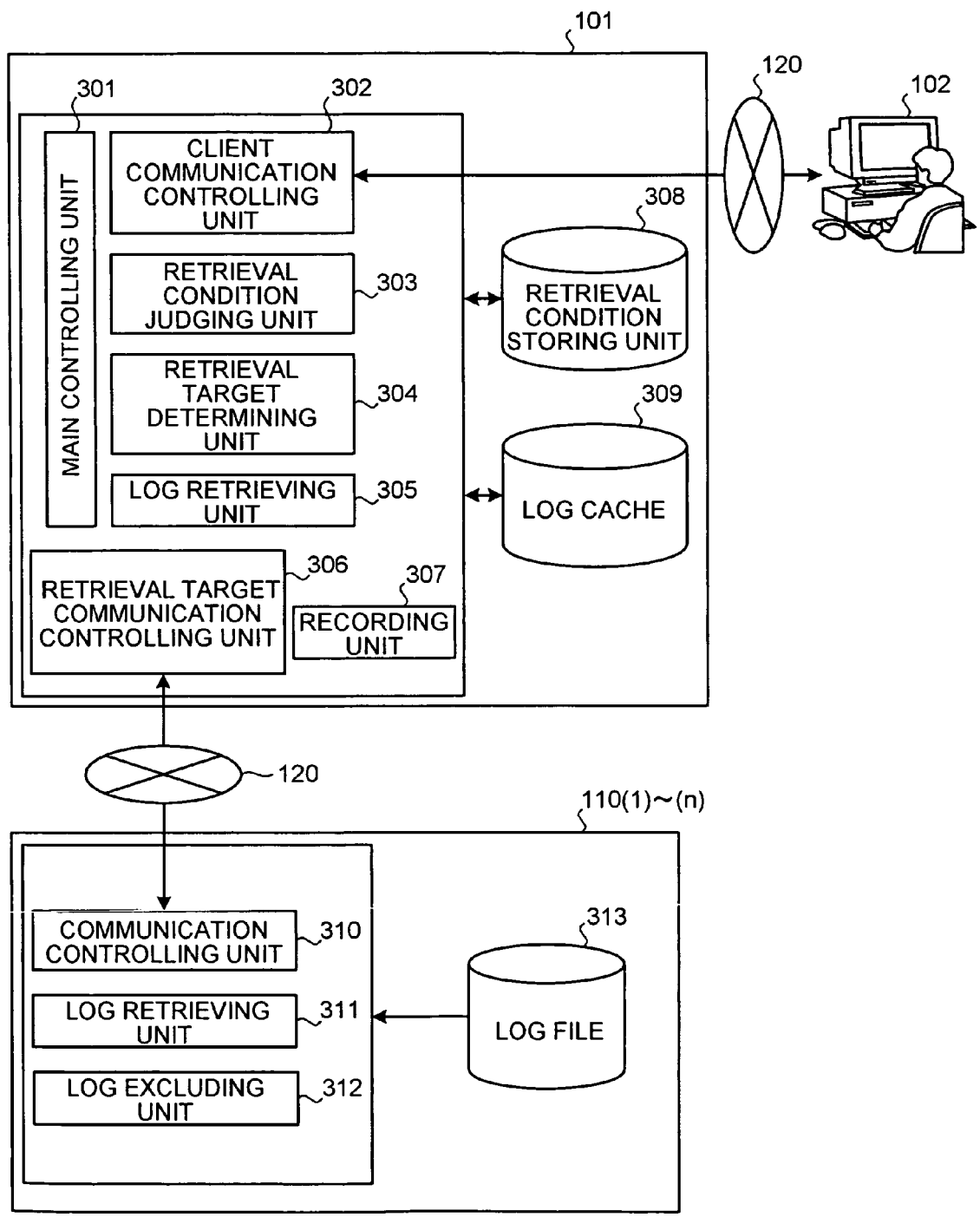
FIG. 3 is a block diagram of the log administration apparatus and an information processing apparatus according to the embodiment.

FIG. 3 is a block diagram of the log administration apparatus and the information processing apparatus. As shown in FIG. 3, the log administration apparatus 101, the administering client 102, and the information processing apparatuses 110(1) to (n) are connected with each other through the network 120. The log administration apparatus 101 is constituted of a main controlling unit 301, a client communication controlling unit 302, a retrieval condition judging unit 303, a retrieval target determining unit 304, a log retrieving unit 305, a retrieval target communication controlling unit 306, a recording unit 307, a retrieval condition storing unit 308, and a log cache 309. Each of the information processing apparatuses 110(1) to (n) is constituted of a communication controlling unit 310, a log retrieving unit 311, a log excluding unit 312, and a log file 313.

The main controlling unit 301 administers the control of the entire log administration apparatus 101 and, more specifically, for example, realizes the function thereof by the CPU 201 shown in FIG. 2. The client communication controlling unit 302 controls communication with the administering client 102 through the network 120, and, more specifically, for example, realizes the function thereof by the I/F 209 shown in FIG. 2. The client communication controlling unit 302 also executes input/output of various types of information between the administering client 102. As the input/output of the various types of information, for example, the unit 302 receives input retrieval conditions that are an input of the retrieval conditions relating to the retrieval of logs of the information processing apparatuses 110(1) to (n), from the administering client 102, and outputs a retrieval result relating to the retrieval of the logs of the information processing apparatuses 110(1) to (n), to the administering client 102.

In the description of FIG. 3, the system is configured to output the retrieval result to the administering client 102. However, the system may be configured to output by an apparatus connected externally such as a printer, otherwise. The output of the retrieval result may be configured to output the retrieval result relating to the retrieval in the log administration apparatus 101 and the retrieval result relating to the retrieval in the information processing apparatuses 110(1) to (n) together.

The retrieval condition judging unit 303 judges whether a relation exists between the input retrieval conditions input by the client communication controlling unit 302 and internal retrieval conditions that are retrieval conditions stored in the retrieval condition storing unit 308 described later. In judging the relation, for example, whether the input retrieval conditions completely coincide with the internal retrieval conditions or are encompassed in the internal retrieval conditions is judged. The unit 303 may be configured to judge whether the input retrieval conditions and the internal retrieval conditions are partially overlapped or do not coincide. The overview of the judgment of the input retrieval conditions and internal retrieval conditions will be described later referring to FIG. 6.

Based on the result of the judgment judged by the retrieval condition judging unit 303, the retrieval target determining unit 304 determines the retrieval target of logs of the information processing apparatuses 110(1) to (n), to be at least any one apparatus of the log administration apparatus 101 and the information processing apparatuses 110(1) to (n). The retrieval target determining unit 304 is configured to, for example, determine the retrieval target of logs to be any one of the log cache 309 and the log file 313, described later.

More specifically, the determination of the retrieval target of logs is executed such that the retrieval target of logs is determined to be the log cache 309 of the log administration apparatus 101 when the input retrieval conditions have been judged by the retrieval condition judging unit 303, to completely coincide with the internal retrieval conditions recorded in the log administration apparatus 101 or are encompassed in the retrieval conditions.

The determination of the retrieval target of logs may be executed such that the retrieval target of logs is determined to be the log file 313 of the information processing apparatuses (1) to (n) when the input retrieval conditions have been judged by the retrieval condition judging unit 303, not to coincide with the internal retrieval conditions recorded in the log administration apparatus 101.

The determination of the retrieval target of logs may be executed such that the retrieval target of logs is determined to be log cache 309 of the log administration apparatus 101 and the log file 313 of the information processing apparatuses (1) to (n) when the input retrieval conditions have been judged by the retrieval condition judging unit 303 to partially coincide with the internal retrieval conditions recorded in the log administration apparatus 101.

The log retrieving unit 305 retrieves the logs that come under the input retrieval conditions in a set of logs recorded in the retrieval target determined by the retrieval target determining unit 304. More specifically, when the retrieval target of logs has been determined to be the log administration apparatus 101 by the retrieval target determining unit 304, the log retrieving unit 305 retrieves the logs that come under the input retrieval conditions from a set of logs recorded in the log cache 309 of the log administration apparatus 101.

When the retrieval target of logs has been determined to be the information processing apparatuses (1) to (n) by the retrieval target determining unit 304, the retrieval by the log retrieving unit 305 may be configured such that the unit 305 requests retrieval by transmitting input retrieval conditions to the information processing apparatuses 110 (1) to (n) and, as a result of transmission of the input retrieval conditions, the retrieval results respectively retrieved by the information processing apparatuses 110(1) to (n) using the input retrieval conditions are received from the information processing apparatuses 110(1) to (n).

Otherwise, the retrieval by the log retrieving unit 305 may be configured such that: when the retrieval target of logs has been determined to be the log administration apparatus 101 and the information processing apparatuses 110(1) to (10) by the retrieval target determining unit 304, the logs that come under the conditions that coincide with the internal retrieval conditions, in the input retrieval conditions, are retrieved from a set of logs recorded in the log cache 309 of the log administration apparatus 101; and, the log retrieving unit 305 requests retrieval by transmitting to the information processing apparatuses 110(1) to (n) the input retrieval conditions, and the conditions that coincide with the internal retrieval conditions in the input retrieval conditions; as a result of the transmission of the input retrieval conditions and conditions that coincide with the internal retrieval conditions in the input retrieval conditions, the retrieval results respectively retrieved by the information processing apparatuses 110(1) to (n) using the input retrieval conditions, and conditions that coincide with the internal retrieval conditions in the input retrieval conditions are received from the information processing apparatuses 110(1) to (n).

The reception of the retrieval results may be configured such that: for the retrieval results of the information processing apparatuses 110(1) to (n), the retrieval is requested by the log administration apparatus 101 through transmitting to the information processing apparatuses (1) to (n) conditions that do not coincide with the internal retrieval conditions in the input retrieval conditions; and as a result of transmission of the conditions that do not coincide with the internal retrieval conditions, in the input retrieval conditions, the retrieval results respectively retrieved by the information processing apparatuses 110(1) to (n) using the conditions that do not coincide with the internal retrieval conditions in the input retrieval conditions, are received from the information processing apparatuses 110(1) to (n).

The retrieval target communication controlling unit 306 controls the communication with the information processing apparatuses 110(1) to (n), through the network 120, and, more specifically, for example, realizes the function thereof by the I/F 209 shown in FIG. 2. The retrieval target communication controlling unit 306 also executes input/output of various types of information to the information processing apparatuses 110(1) to (n). For example, when the information processing apparatuses 110 (1) to (n) are included in the retrieval targets described above, the input/output of the various information are requests of the retrieval executed to the information processing apparatuses 110(1) to (n) and retrieval results transmitted from the information processing apparatuses 110 (1) to (n) in response to the retrieval requests.

When the input retrieval conditions are judged by the retrieval condition judging unit 303 not to coincide with the internal retrieval conditions recorded in the log administration apparatus 101, the recording unit 307 records in the log administration apparatus 101 the input retrieval conditions and the retrieval results retrieved by the log retrieving unit 305. More specifically, for example, the recording unit 307 correlates the input retrieval conditions with the retrieval results and record those in the retrieval condition storing unit 308 and records the retrieval results in the log cache 309.

When the input retrieval conditions are judged by the retrieval condition judging unit 303 to partially coincide with the internal retrieval conditions recorded in the log administration apparatus 101, the recording unit 307 records in the log administration apparatus 101 the conditions that do not coincide with the internal retrieval conditions in the input retrieval conditions and the internal retrieval conditions, and the retrieval results retrieved by the log retrieving unit 305. More specifically, the recording unit 307 correlates the conditions that do not coincide with the internal retrieval conditions in the internal retrieval conditions and the input retrieval conditions with the retrieval results retrieved by the log retrieving unit 305, records in the retrieval condition storing unit 308 the conditions that do not coincide with the internal retrieval conditions in the internal retrieval conditions and the input retrieval conditions, and records the retrieval result in the log cache 309. These retrieval results are the retrieval results obtained by combining the retrieval results relating to the retrieval in the log administration apparatus 101 described above and the retrieval results relating to the retrieval in the information processing apparatuses 110(1) to (n).

The retrieval condition storing unit 308 stores the retrieval conditions recorded by the recording unit 307 as the internal retrieval conditions and, more specifically, realizes the function thereof by a recording medium such as the HD 205, the FD 207, etc., shown in FIG. 2. Yet more specifically, the retrieval condition storing unit 308 stores the input retrieval conditions when the input retrieval conditions do not coincide with the internal retrieval conditions stored in advance. The retrieval condition storing unit 308 may be configured to store internal retrieval conditions and the conditions that do not coincide with the internal retrieval conditions in the input retrieval conditions when the input retrieval conditions partially coincide with the internal retrieval conditions that have been stored. In other words, the retrieval condition storing unit 308 may be configured to store accumulatively the conditions that do not coincide with the internal retrieval conditions stored in advance, in the retrieval conditions that are the grounds for outputting the retrieval results. The storage by the retrieval condition storing unit 308 may be configured to accumulate the content of storage up to a predetermined capacity and, when the predetermined capacity is reached, delete the oldest portion of the content one after another.

The log cache 309 stores the retrieval results recorded by the recording unit 307, and more specifically, realizes the function thereof by a recording medium such as the HD 205, FD 207, etc., shown in FIG. 2. For example, the retrieval results are stored being correlated with the internal retrieval conditions stored in the retrieval conditions storing unit 308. The overview of the internal retrieval conditions stored in the retrieval condition storing unit 308 and the retrieval results stored in the log cache 309 will be described later referring to FIG. 4 and FIG. 5.

The communication controlling unit 310 controls communication with the log administration apparatus 101 through the network 120 such as the Internet, and more specifically, for example, realizes the function thereof by the I/F 209 shown in FIG. 2. The communication controlling unit 310 also executes input/output of various types of information to the log administration apparatus 101. Yet more specifically, as the input/output of the various types of information, for example, the communication controlling unit 310 receives retrieval requests described above and transmits the retrieval results retrieved by the log retrieving unit 311 described later to the log administration apparatus 101 based on the retrieval requests received.

The log retrieving unit 311 retrieves the logs that come under the condition that do not coincide with the internal retrieval conditions in the input retrieval conditions in the set of logs recorded in the information processing apparatuses 110(1) to (n) based on the result of comparison between the input retrieval condition input into the log administration apparatus 101 and the internal retrieval conditions recorded in the log administration apparatus 101.

More specifically, for example, the log retrieving unit 311 extracts the logs that come under the input retrieval conditions as a first extraction result from the set of logs recorded in the information processing apparatuses 110(1) to (n) based on the input retrieval conditions when the input retrieval conditions and the conditions that coincide with the internal retrieval conditions in the input retrieval conditions are received by the communication controlling unit 310 from the log administration apparatus 101; and extracts the logs that come under the conditions that coincide with the internal retrieval conditions in the input retrieval conditions as a second extraction result from the logs extracted as the first extraction result. The logs left by excluding the second extraction result from the first extraction result by the log excluding unit 312 are the retrieval result.

The log retrieving unit 311 may be configured to retrieve the logs that relate to the conditions that do not coincide with the internal retrieval conditions in the input retrieval conditions in the set of logs recorded in the information processing apparatuses 110(1) to (n) when the conditions that do not coincide with the internal retrieval conditions in the input retrieval conditions are received by the communication controlling unit 310 from the log administration apparatus 101.

The log file 313 stores the logs in the information processing apparatuses 110(1) to (n) and, more specifically, realizes the function thereof by a recording medium such as the HD 205, the FD 207, etc., shown in FIG. 2.

More specifically, the retrieval condition judging unit 303, the retrieval target determining unit 304, the log retrieving unit 305, 311, the recording unit 307, the log excluding unit 312 described above referring to FIG. 3 realize the function thereof through, for example, execution by the CPU 201 of a program recorded in a recording medium such as the ROM 202, the RAM 203, the HD 205, etc., shown in FIG. 2, or by the HDD 204 or the FDD 206.

Referring to FIG. 4 and FIG. 5, the internal retrieval conditions stored in the retrieval condition storing unit 308 and the retrieval results stored in the log cache 309 according to the embodiment of the present invention will be described. FIG. 4 is a schematic showing an example of the internal retrieval conditions stored in the retrieval condition storing unit.

In FIG. 4, in internal retrieving conditions 400, serial numbers and retrieval conditions corresponding to the serial numbers as the condition content are listed. The internal retrieval conditions 400 may contain the date and the time at which log retrieval was executed and the attributes of the apparatuses, and may be configured to be accumulated and be provided with serial numbers in order of the time at which retrieval is executed by the log retrieving unit 305 or the log retrieving unit 311. More specifically, for example, the internal retrieval conditions 400 are updated by providing serial numbers to the input retrieval conditions when the input retrieval conditions are determined by the retrieval condition judging unit 303 not to coincide with the internal retrieval conditions 400 recorded in the log administration apparatus 101 in advance. The internal retrieval conditions 400 are updated by providing serial numbers to the conditions that do not coincide with the internal retrieval conditions 400 in the internal retrieval conditions 400 and the input retrieval conditions when the input retrieval conditions are determined by the retrieval condition judging unit 303 not to partially coincide with the internal retrieval conditions 400 recorded in the log administration apparatus 101 in advance.

The internal retrieval conditions 400 may be configured to update the serial numbers to new serial numbers to retrieve in the log cache 309 based on the internal retrieval conditions 400 already stored when the input retrieval conditions are determined by the retrieval condition judging unit 303 to completely coincide with or be encompassed in the internal retrieval conditions 400 recorded in the log administration apparatus 101 in advance. The internal retrieval conditions 400 may be configured to be deleted the oldest portion thereof one after another.

FIG. 5 is a schematic showing an example of the retrieval result stored in the log cache. As shown in FIG. 5, condition numbers and log messages respectively corresponding to the condition numbers are listed in retrieval results 500. The retrieval results 500 may be configured to accumulate the retrieval results in order of reception of the retrieval results from the information processing apparatuses 110(1) to (n) respectively for each log message. As the condition numbers, for example, serial numbers in the internal retrieval conditions 400, that have been obtained when the log messages have been retrieved are stored. The condition numbers are updated when a log message has been obtained by retrieval in the log cache 309. In other words, for example, a serial number of a retrieval condition, that has been provided when the latest log message has been retrieved is set. The retrieval results 500 may be configured to deleted, when a condition is deleted in the internal retrieval conditions 400, a corresponding condition number.

Figure 6:
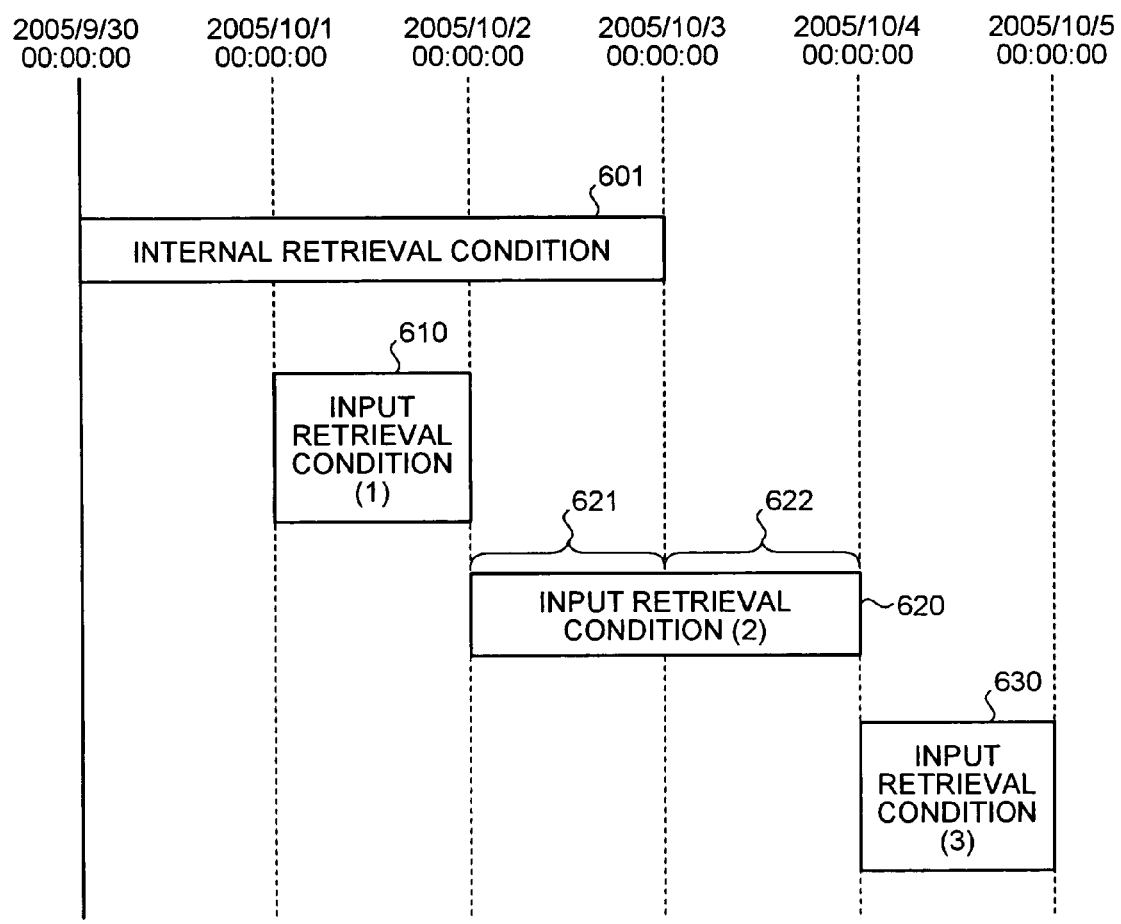
FIG. 6 is a schematic for illustrating judgment of an input retrieval condition and the internal retrieval condition by a retrieval condition judging unit according to the embodiment.

FIG. 6 is a schematic for illustrating judgment of an input retrieval condition and the internal retrieval condition by the retrieval condition judging unit. An internal retrieval condition 601 is an example of the internal retrieval condition stored in the retrieval condition judging unit 308, and is the condition used to retrieve logs in the information processing apparatuses 110 (1) to (n) from the time and the date of 00:00:00 on 2005/9/30 (0:00:00 midnight on Sep. 30, 2005) to 00:00:00 on 2005/10/3.

An input retrieval condition (1) 610 is an example of an input retrieval condition input from the administering client 102, and is a condition used for retrieving logs in the information processing apparatuses 110(1) to (n) from the time and the date of 00:00:00 on 2005/10/1 to 00:00:00 on 2005/10/2. The input retrieval condition (1) 610 is a condition that is encompassed in the internal retrieval condition 601.

An input retrieval condition (2) 620 is an example of an input retrieval condition input from the administering client 102, and is a condition used for retrieving logs in the information processing apparatuses 110(1) to (n) from the time and the date of 00:00:00 on 2005/10/2 to 00:00:00 on 2005/10/4. The input retrieval condition (2) 620 is a condition that partially coincides with the internal retrieval condition 601. The portion 621, that coincides with the internal retrieval condition 601, of the input retrieval condition (2) 620 is a condition used to retrieve logs in the information processing apparatuses 110(1) to (n) from the time and the date of 00:00:00 on 2005/10/2 to 00:00:00 on 2005/10/3. The portion 622, that does not coincide with the internal retrieval condition 601, of the input retrieval condition (2) 620 is a condition used to retrieve logs in the information processing apparatuses 110 (1) to (n) from the time and the date of 00:00:00 on 2005/10/3 to 00:00:00 on 2005/10/4.

Similarly, an input retrieval condition (3) 630 is an example of an input retrieval condition input from the administering client 102, and is a condition used to retrieve logs in the information processing apparatuses 110 (1) to (n) from the time and the date of 00:00:00 on 2005/10/4 to 00:00:00 on 2005/10/5. The input retrieval condition (3) 630 is a condition that does not coincide with the internal retrieval condition 601.

Referring to FIG. 3, a case where inputs of the input retrieval conditions (1) 610, (2) 620, and (3) 630 of FIG. 6 are accepted. When an input of the input retrieval condition (1) 610 is accepted from the administering client 102, the input retrieval condition (1) 610 is judged by the retrieval condition judging unit 303 not to be encompassed in the internal retrieval condition 601 stored in the retrieval condition storing unit 308. The retrieval target of logs is determined by the retrieval target determining unit 304 to be the log cache 309 and retrieval is executed.

When an input of the input retrieval condition (2) 620 is accepted from the administering client 102, the input retrieval condition (2) 620 is judged by the retrieval condition judging unit 303 to partially coincide with the internal retrieval condition 601 stored in the retrieval condition storing unit 308. Logs are retrieved from the log cache 309 for the portion 621 that coincides with the internal retrieval condition 601. Retrieval is requested to the information processing apparatuses 110(1) to (n) for the portion 622 that does not coincide with the internal retrieval condition 601.

When an input of the input retrieval condition (3) 630 is accepted from the administering client 102, the input retrieval condition (3) 630 is judged by the retrieval condition judging unit 303 not to coincide with the internal retrieval condition 601 stored in the retrieval condition storing unit 308. The retrieval target of logs is determined by the retrieval target determining unit 304 to be the information processing apparatus 110(1) to (n) and retrieval is executed.

Figure 7:
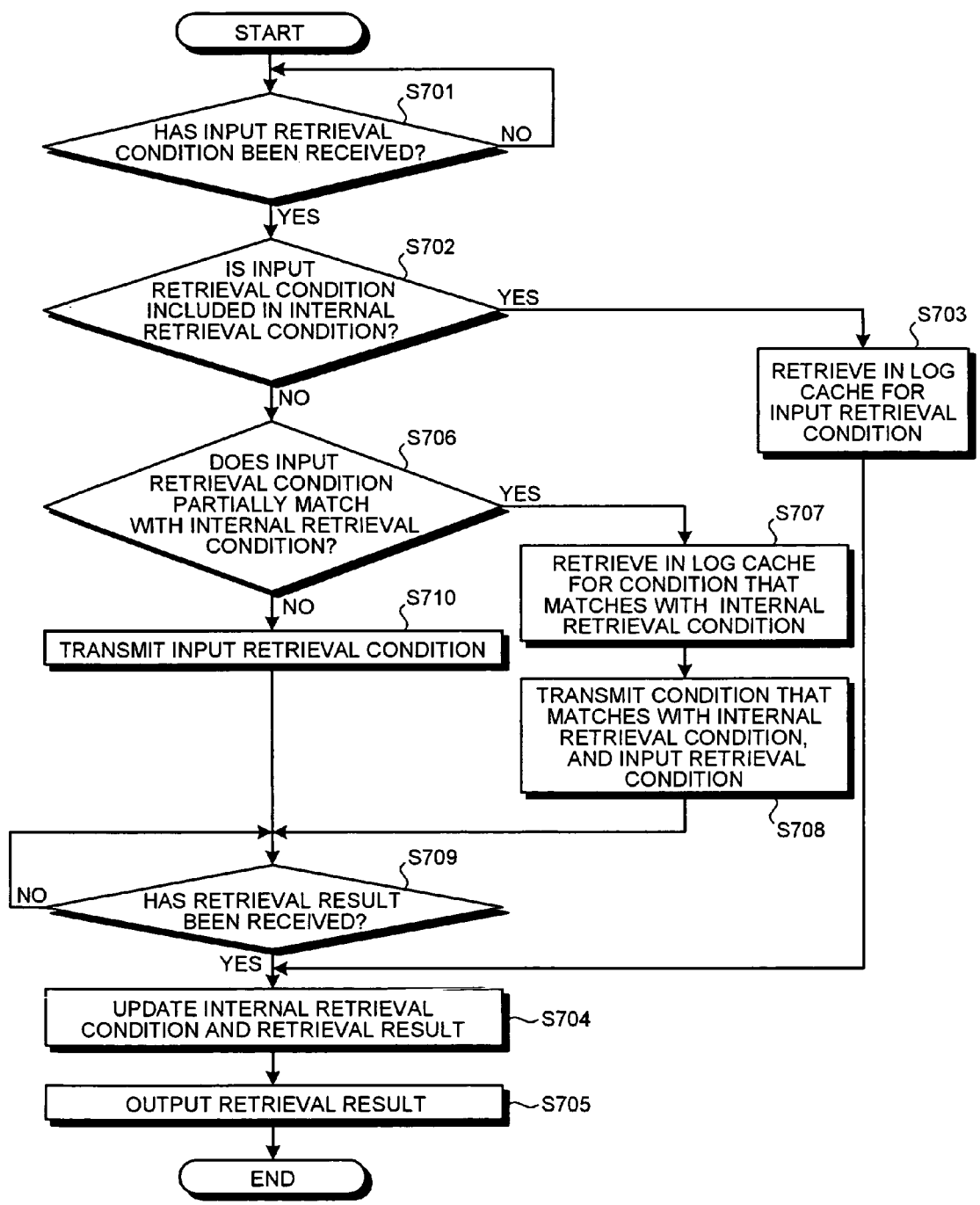
FIG. 7 is a flowchart of a process by the log administration apparatus.

FIG. 7 is a flowchart of a process by the log administration apparatus. In the flowchart of FIG. 7, whether an input of the input retrieval condition is accepted from the administering client 102 is determined by the client communication controlling unit 302 (step S701). Acceptance of the input of the input retrieval condition is waited for and, when the input is accepted (step S701: "YES"), whether the input retrieval condition input at step S701 is encompassed in the internal retrieval conditions stored in advance in the retrieval condition storing unit 308 is judged by the retrieval condition judging unit 303 (step S702). "To encompass" used herein also means to completely coincide.

At step S702, when the input retrieval condition input is encompassed in the internal retrieval conditions stored in advance in the retrieval condition storing unit 308 (step S702: "YES"), the retrieval target is determined by the retrieval target determining unit 304 to be the log cache 309 and retrieval is executed in the log cache 309 by the log retrieving unit 305 for the input retrieval condition input at step S701 (step S703).

Based on the input retrieval condition input at step S701 and the retrieval result retrieved at step S703, the internal retrieval conditions and the retrieval results described referring to FIG. 4 and FIG. 5 are updated by the recording unit 307 (step S704). Updating of the retrieval results is executed such that, for example, the internal retrieval conditions stored in the retrieval condition storing unit 308 and the retrieval results stored in the log cache 309 are correlated with each other and are accumulated up to a predetermined capacity, and the oldest of the stored internal retrieval conditions and the retrieval results is deleted one after another when the predetermined capacity is exceeded.

The retrieval result retrieved at step S703 is outputted by the client communication controlling unit 302 to the administering client 102 (step S705), and the series of steps end.

At step S702, when the input retrieval condition input is not encompassed in the internal retrieval conditions stored in advance in the retrieval condition storing unit 308 (step S702: "NO"), whether the input retrieval condition input at step S701 partially coincides with the internal retrieval conditions stored in advance in the retrieval condition storing unit 308 is judged by the retrieval condition judging unit 303 (step S706).

At step S706, when the input retrieval condition input partially coincides with the internal retrieval conditions stored in advance in the retrieval condition storing unit 308 (step S706: "YES"), the retrieval target of logs is determined by the retrieval target determining unit 304 to be the log cache 309 and the log file 313, and retrieval is executed by the log retrieving unit 305 in the log cache 309 for the condition that coincides with the internal retrieval conditions in the input retrieval conditions input at step S701 (step S707).

The conditions that coincides with the internal retrieval conditions in the input retrieval conditions and input retrieval conditions are transmitted by the retrieval target communication controlling unit 306 to the information processing apparatus 110(1) to (n) (step S708). This step S708 may be configured to, instead of transmitting the condition that coincides with the internal retrieval conditions in the input retrieval conditions and the input retrieval conditions, request retrieval to the information processing apparatuses 110(1) to (n) by transmitting thereto the condition that does not coincide with the internal retrieval condition in the input retrieval conditions.

As a result of transmitting the condition that coincides with the internal retrieval conditions and input retrieval conditions at step S708, whether a retrieval result retrieved using the condition that coincides with the internal retrieval conditions and input retrieval conditions by the information processing apparatuses 110 (1) to (n) transmitted from the information processing apparatuses 110(1) to (n) has been received is determined (step S709).

At step S709, when reception of the retrieval result is waited for and the retrieval result is received (step S709: "YES"), based on the retrieval result retrieved at step S707 and the retrieval result received at step S 709, the internal retrieval conditions and the retrieval results described referring to FIG. 4 and FIG. 5 are updated by the recording unit 307 (step S704).

More specifically, for example, at step S706, the internal retrieval conditions are to update the internal retrieval conditions determined to partially coincide and the condition that does not coincide with the internal retrieval conditions in the input retrieval conditions. The retrieval result retrieved at step S707 and retrieved result received at step S709 are together regarded as a retrieved result and are updated being correlated with each other.

The retrieval result retrieved at step S707 and retrieved result received at step 709 are collectively regarded as a retrieval result and this retrieval result is outputted by the client communication controlling unit 302 to the administering client 102 (step S705), and the series of steps end.

At step S706, when input retrieval condition input does not partially coincide with the internal retrieval conditions stored in advance in the retrieval condition storing unit 308 (step S706: "NO"), the retrieval target of logs is determined by the retrieval target determining unit 304 to be the log file 313, and the input retrieval condition input at step S701 is transmitted by the retrieval target communication controlling unit 306 to the information processing apparatuses 110(1) to (n) (step S710).

As a result of transmitting the conditions at step S710, whether the retrieval result retrieved using the input retrieval condition transmitted by the information processing apparatuses 110(1) to (n) has been received is determined (step S709).

At step S709, when reception of the retrieval result is waited for and the retrieval result is received (step S709: "YES"), the internal retrieval conditions and the retrieval results described referring to FIG. 4 and FIG. 5 are updated by the recording unit 307 (step S704). More specifically, the received retrieval results that are the internal retrieval conditions to update the input retrieval conditions input at step S701, are correlated with the retrieval result received at step S709, and are updated.

The retrieval result retrieved at step S709 is regarded as a retrieval result and this retrieval result is outputted by the client communication controlling unit 302 to the administering client 102 (step S705), and the series of steps end.

Figure 8:
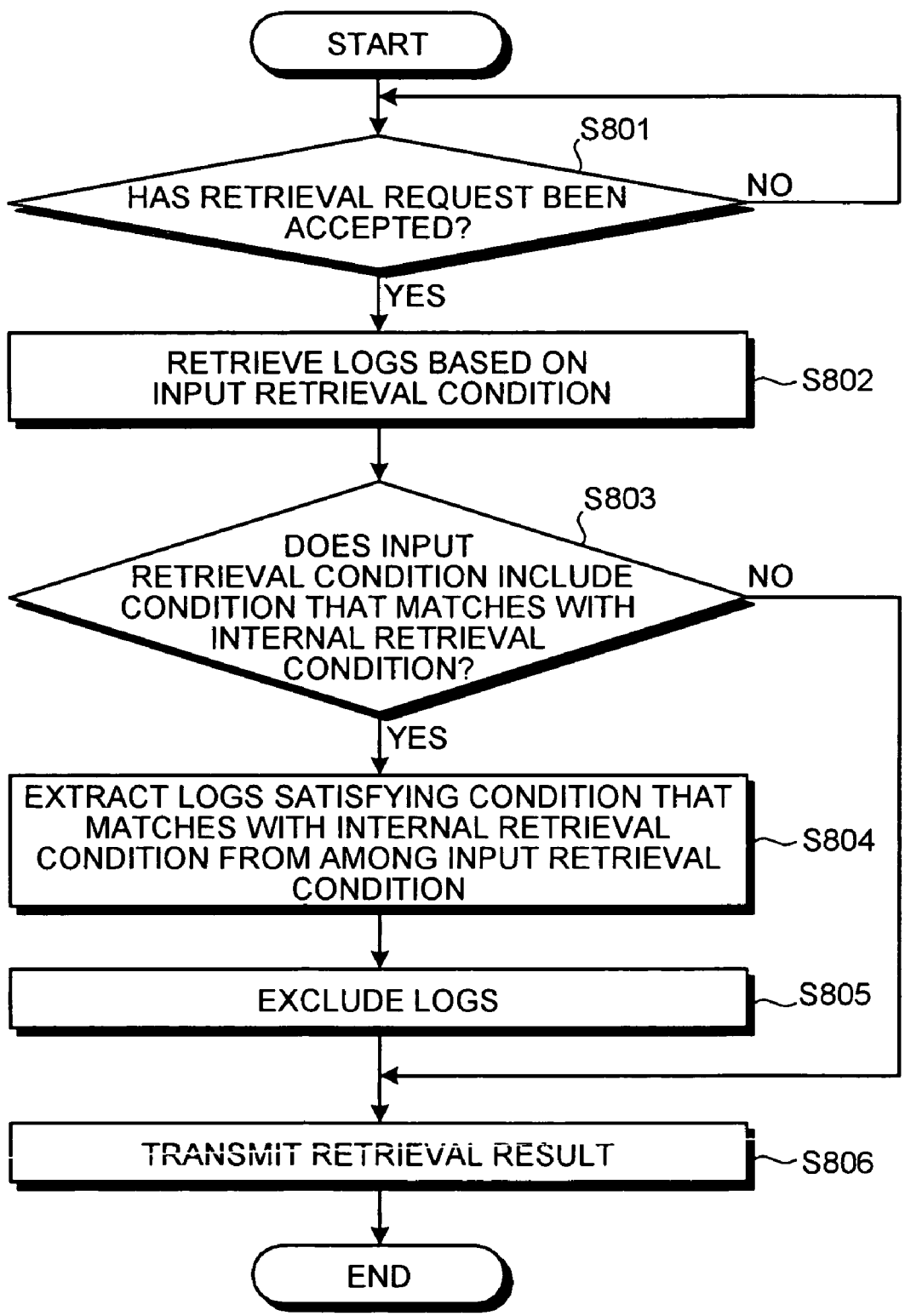
FIG. 8 is a flowchart of a process by the information processing apparatus.

FIG. 8 is a flowchart of a process by the information processing apparatus. In the flowchart of FIG. 8, whether the retrieval request transmitted from the log administration apparatus 101 has been accepted is determined (step S801). The retrieval request at this step S801 is, for example, a condition that coincides with the input retrieval conditions and the condition that coincides with the internal retrieval conditions in the input retrieval conditions that have been transmitted at step S708 or step S710 described above referring to FIG. 7.

At step S801, when reception of the retrieval result is waited for and the retrieval result is received (step S801: "YES"), logs are retrieved by the log retrieving unit 311 from the set of logs stored in the log file 313 for the input retrieval conditions in the retrieval request received at step S801 (step S802).

Whether the retrieval request received at step S801 includes the condition that coincides with the internal retrieval conditions in the input retrieval conditions is judged (step S803). When the retrieval request includes the condition that coincides with the internal retrieval conditions in the input retrieval conditions (step S803: "YES"), logs are extracted from the set of logs retrieved at step S802 for the condition that coincides with the internal retrieval conditions in the input retrieval conditions (step S804). The logs extracted at step S804 are excluded by the log excluding unit 312 from the logs extracted at step S802 (step S805) and the remaining logs are regarded as a retrieval result.

The retrieval result obtained in step S805 is transmitted by the communication controlling unit 310 to the log administration apparatus 101 (step S806), and the series of steps end.

At step S803, when the retrieval request received at step S801 does not include the condition that does not coincide with the internal retrieval conditions in the input retrieval conditions (step S803: "NO"), the logs retrieved at step S802 are transmitted by the communication controlling unit 310 as a retrieval result to the log administration apparatus 101 (step S806), and the series of steps end.

In the flowchart of FIG. 8, in response to the retrieval request accepted at step S801, logs are retrieved for the input retrieval conditions at step S802 and whether the conditions that coincide with the internal retrieval conditions in the input retrieval conditions is judged at step S803. In these steps, as described above referring to FIG. 7, the retrieval may be configured such that, when the retrieval request accepted at step S801 is the conditions that do not coincide with the internal retrieval conditions in the input retrieval conditions, logs are retrieved by the log retrieving unit 311 for the conditions that do not coincide with the internal retrieval conditions in the input retrieval conditions at step S802; and the retrieval result retrieved at step S802 is transmitted at step S806.

As described above, according to the embodiment of the present invention, when logs of the information processing apparatuses administered by log administration apparatus are retrieved, whether logs are retrieved from the log cache of the log administration apparatus based on the input retrieval conditions input or are retrieved in the information processing apparatuses can be judged. Therefore, when logs can be retrieved from the log cache of the log administration apparatus, logs can be retrieved without transmission/reception of data to/from the information processing apparatuses and the load on the network can be reduced as well as improvement of retrieval response can be facilitated.

According to the embodiment of the present invention, whether logs are retrieved from the log cache of the log administration apparatus or are retrieved in the information processing apparatuses can be judged, and a retrieval result can be received from the information processing apparatuses for the logs that can not be retrieved from the log cache. In other words, in the information processing apparatuses, because the retrieval result can be transmitted excluding the logs that can be retrieved in the log administration apparatus, wasteful data transmission/reception can be precluded and reduction of the load on the network can be facilitated.

According to the embodiment of the present invention, because the retrieval target is determined for each input retrieval condition input, general-purpose retrieval can be executed and the optimization of log retrieval can be facilitated. According to the embodiment of the present invention, the retrieval conditions and the retrieval results stored in the log administration apparatus can be updated, and retrieval conditions and retrieval results suitable for the present state can be stored in the cache.

According to the embodiment of the present invention, logs are retrieved using the conditions necessary for maintenance work and research on the cause of occurrence of a fault as the input retrieval conditions, and the load on the network can be reduced as well as improvement of the retrieval response can be facilitated. Therefore, the necessary time and the number of steps of handling of the maintenance work and research on the cause of occurrence of a fault can be reduced.

The log retrieving method described in the embodiment may be realized by executing a program prepared in advance, on a computer such as a personal computer, a work station, etc. This program is recorded in a computer-readable recording medium such as a hard disk, a flexible disk, a CD-ROM, an MO, a DVD, etc., and is executed by being read from the recording medium by the computer. This program may be a transmission medium capable of being distributed through a network such as the Internet, etc.

According to the present invention, loads on the network and an administering system can be reduced while improving retrieval response.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer-readable recording medium that stores therein a computer program for retrieving a log of an information processing apparatus connected, through a network, to a log administration apparatus that administers logs, the computer program making a computer execute steps comprising:

receiving a retrieval condition for a log of the information processing apparatus;

judging whether input retrieval condition has relevance to a retrieval condition recorded in a log cache in the log administration apparatus;

determining a retrieval target from which the log is to be retrieved, the retrieval target being selected to include at least one of the log administration apparatus and the information processing apparatus based on a result of judgment at the judging;

retrieving a log satisfying the retrieval condition from among logs recorded in the retrieval target; and outputting a result of retrieval at the retrieving, wherein the judging includes judging coincidence between the input retrieval condition and the recorded retrieval condition, the determining includes selecting the log cache of the log administration apparatus as the retrieval target when it is judged, at the judging, that the input retrieval condition completely coincides with the recorded retrieval condition or that the input retrieval condition is included in the recorded retrieval condition, and the determining includes selecting the information processing apparatus as the retrieval target when it is judged, at the judging, that the input retrieval condition does not coincide with the recorded retrieval condition.

2. The computer-readable recording medium according to claim 1, wherein the computer program further makes the computer execute:

transmitting the input retrieval condition to the information processing apparatus when the retrieval target is determined to be the information processing apparatus; and receiving a result of retrieval based on transmitted retrieval condition from the information processing apparatus.

3. The computer-readable recording medium according to claim 1, wherein the judging includes judging coincidence between the input retrieval condition and the recorded retrieval condition, and the determining includes determining the retrieval target to both the log administration apparatus and the information processing apparatus when it is judged, at the judging, that the input retrieval condition partially coincides with the recorded retrieval condition.

4. The computer-readable recording medium according to claim 3, wherein when the retrieval target is determined to be both the log administration apparatus and the information processing apparatus, the retrieving includes retrieving a log satisfying the recorded retrieval condition from logs recorded in the log administration apparatus, and the computer program further makes the computer execute:

transmitting the input retrieval condition and a condition that coincides with the recorded retrieval condition from among the input retrieval condition to the information processing apparatus; and receiving a result of retrieval based on transmitted input retrieval condition and transmitted condition that coincides with the recorded retrieval condition from the information processing apparatus, and the outputting includes outputting the results of retrieval.

5. The computer-readable recording medium according to claim 3, wherein when the retrieval target is determined to be both the log administration apparatus and the information processing apparatus, the retrieving includes retrieving a log satisfying the recorded retrieval condition from logs recorded in the log administration apparatus, and the computer program further makes the computer execute:

transmitting a condition that does not coincide with the recorded retrieval condition from among the input retrieval condition to the information processing apparatus; and receiving a result of retrieval based on transmitted condition that does not coincide with the recorded retrieval condition from the information processing apparatus, and the outputting includes outputting the results of retrieval.

6. The computer-readable recording medium according to claim 1, wherein the judging includes judging coincidence between the input retrieval condition and the recorded retrieval condition, and when it is judged, at the judging, that the input retrieval condition does not to coincide with the recorded retrieval condition, the computer program further makes the computer execute recording the input retrieval condition and the result of retrieval in the log administration apparatus.

7. The computer-readable recording medium according to claim 6, wherein the recording includes recording the input retrieval condition and the result of retrieval in an associated manner.

8. The log retrieving program according to claim 1, wherein the judging includes judging coincidence between the input retrieval condition and the recorded retrieval condition, and when it is judged, at the judging, that the input retrieval condition partially coincides with the recorded retrieval condition, the computer program further makes the computer execute recording the recorded retrieval condition, a condition that does not coincide with the recorded retrieval condition from among the input retrieval condition, and the result of retrieval in the log administration apparatus.

9. The computer-readable recording medium according to claim 8, wherein the recording includes recording the recorded retrieval condition, the condition that does not coincide with the recorded retrieval condition, and the result of retrieval in an associated manner.

10. A log administration apparatus, comprising:

a receiving unit configured to receive a retrieval condition for a log of an information processing apparatus;

a judging unit configured to judge whether input retrieval condition has relevance to a retrieval condition recorded in a log cache in the log administration apparatus;

a determining unit configured to determine a retrieval target from which the log is to be retrieved, the retrieval target being selected to include at least one of the log administration apparatus and the information processing apparatus based on a result of judgment by the judging unit;

a retrieving unit configured to retrieve a log satisfying the retrieval condition from among logs recorded in the retrieval target;

a storage unit configured to store at least one of a retrieval results of said retrieval unit and said retrieval condition;

an output unit configured to output a result of retrieval by the retrieving unit, wherein the judging unit includes judging coincidence between the input retrieval condition and the recorded retrieval condition, the determining unit selects the log cache of the log administration apparatus as the retrieval target when it is judged, at the judging, that the input retrieval condition completely coincides with the recorded retrieval condition or that the input retrieval condition is included in the recorded retrieval condition, and the determining unit selects the information processing apparatus as the retrieval target when it is judged, at the judging, that the input retrieval condition does not coincide with the recorded retrieval condition.

11. A method of retrieving a log of an information processing apparatus connected, through a network, to a log administration apparatus that administers logs, comprising:

receiving a retrieval condition for a log of the information processing apparatus;

judging whether input retrieval condition has relevance to a retrieval condition recorded in the log administration apparatus;

determining a retrieval target from which the log is to be retrieved, the retrieval target being selected to include at least one of the log administration apparatus and the information processing apparatus based on a result of judgment at the judging;

retrieving a log satisfying the retrieval condition from among logs recorded in the retrieval target; and outputting a result of retrieval at the retrieving, wherein the judging includes judging coincidence between the input retrieval condition and the recorded retrieval condition, the determining includes selecting the log cache of the log administration unit as the retrieval target when it is judged, at the judging, that the input retrieval condition completely coincides with the recorded retrieval condition or that the input retrieval condition is included in the recorded retrieval condition, and the determining includes selecting the information processing apparatus as the retrieval target when it is judged, at the judging, that the input retrieval condition does not coincide with the recorded retrieval condition.

* * * * *